United States Patent Office 3,017,783
Patented Jan. 23, 1962

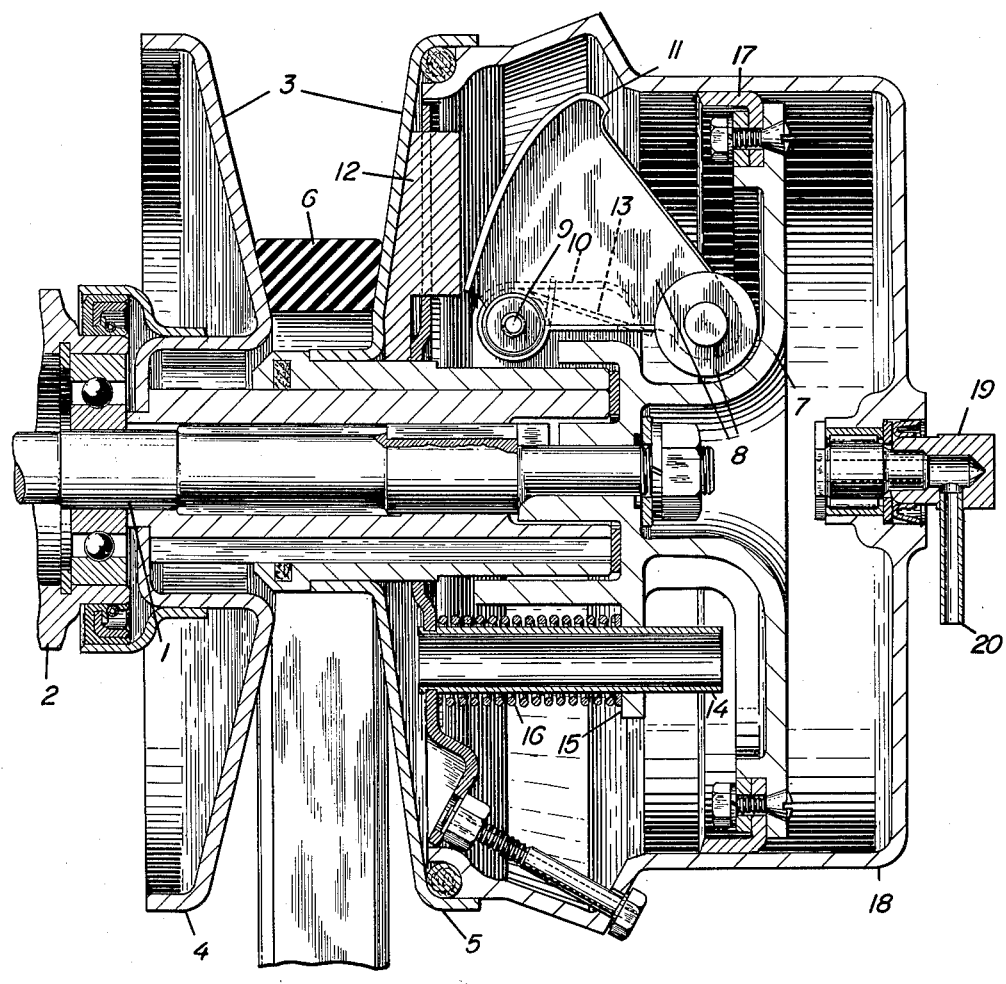

3,017,783
VARIABLE SPEED TRANSMISSION
Joan van der Brugghen and Wilhelm Frans Maria Hendriks, Eindhoven, Netherlands, assignors to Van Doorne's Automobielfabriek N.V., Eindhoven, Netherlands, a limited liability company of the Netherlands
Filed Jan. 12, 1959, Ser. No. 786,296
Claims priority, application Netherlands Jan. 20, 1958
2 Claims. (Cl. 74—230.17)

The invention relates to a variable speed transmission, particularly for a motor vehicle, comprising axially extensible pulleys.

An object of the invention is to provide an improvement in transmissions of this type. The objects normally sought are that at each speed of the vehicle a reduction is automatically made so that maximum power is available and, if only a part of the power is required, the most economical reduction is obtained.

A further object of the invention is to provide an efficient transmission which may be simply and economically manufactured.

A still further object of the invention is to provide a construction wherein centrifugal weights or the like having curved faces are designed to coact with the slidable element of the pulley.

A still further object of the invention is to provide a construction wherein a vacuum device connected with the suction tube of the engine cooperates with the slidable element of the pulley.

A further object of the invention is to provide a transmission construction wherein a centrifugal mechanism acts on a slidable element of a pulley to counteract the force of resilient elements coacting therewith.

A still further object of the invention is to provide a transmission which can adapt itself automatically to different speeds of the vehicle even when such vehicle is rounding a curve without losing power.

The drawing shows a cross-sectional view of a construction of a primary pulley comprising a fixed element and a slidable element.

The driving shaft 1 is supported in a housing 2 by means of ball bearings and the fixed element of the pulley 3 is indicated at 4. The slidable element 5 of the pulley is mounted slidably upon the shaft 1. As shown in the figure the pulley 3 is illustrated in its opened position wherein the belt 6 which may be of any desired type is run at its smallest diameter.

A part 7 is fixedly secured to the shaft 1 and carries a plurality of centrifugal weights 8 preferably three in number. Only one of such centrifugal weights is shown in the figure and each centrifugal weight is adapted to pivot about a pin 9 located on a projecting portion 10 of the part 7. Each centrifugal weight 8 has a sector shape with a curved pressure face 11 contacting a radially extending face 12 provided upon the slidable pulley element 5. A light spring 13 maintains the pressure face 11 in contact with the face 12 when the shaft 1 is not rotating and consequently the centrifugal weights 8 are not swung outwardly.

A guide tube 14 is fixed to the slidable element 5 and preferably there are three of such guiding tubes. Each guiding tube 14 extends through a flange 15 provided upon the part 7 and is surrounded by a helical spring 16 urging the pulley elements 4 and 5 together.

When the shaft 1 rotates the centrifugal weights 8 are swung outwardly pivoting upon their pins 9 and the pressure faces 11 roll along the faces 12 thereby urging the slidable element 5 towards the fixed element 4. The faces 11 are provided with a special curvature which is determined by the special requirements required with regard to the reduction of the transmission.

The part 7 fixed to the shaft 1 is constructed as a piston and has at its perimeter a sealing member 17. This piston is displaceable within a cylinder 18 which is fixed to the slidable pulley element 5. A nipple 19 is rotatably mounted at the center of the cylinder 18 and a conduit 20 leads thereto. The conduit 20 is connected to the suction tube of the engine and thereby the interior of the cylinder 18 is in connection with the suction existing in the engine.

If in connection with the load of the engine and the degree of opening of the throttle valve there is a vacuum of more or less strength in the suction tube, this vacuum is transmitted to the cylinder 18 by the conduit 20 and the nipple 19. The stronger or less strong vacuum in the cylinder 18 presses the pulley element 5 in greater or lesser degree in the direction of the pulley element 4. In this way an automatic adjustment of the pulley 3 is obtained dependent on the torque which is exerted by the engine. The adjusting device working by means of the centrifugal weights 8 is thus assisted by the vacuum device so that this does not only depend on the rotation speed of the shaft 1, but also on the resistance which is to be overcome.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawing being merely a preferred embodiment thereof.

What is claimed is:

1. Axially expandable and contractable pulley elements in combination with a driving shaft comprising a first element of said pulley slidably mounted on said shaft, a second element of said pulley fixed to said shaft, a piston fixedly secured to said shaft, a cylinder fixed to said slidable element adapted to reciprocate together with said first element with respect to said piston, sealing means between said piston and said cylinder, a bottom on said cylinder spaced from said slidable element, a nipple rotatively mounted in the center of said bottom, a tube fixed to said nipple outside of said cylinder, spring means arranged between said slidable element and said piston urging them apart, at least two pivots arranged in an extension of said piston in a plane perpendicular to said shaft, a centrifugal weight pivoted on each of said pivots having a curved face, substantially radial faces on said slidable element coacting with the curved faces of said weights to move said slidable element to said second element of said pulley.

2. A pulley as set forth in claim 1 wherein a second spring means maintains said curved faces in contact with said radial faces.

References Cited in the file of this patent

UNITED STATES PATENTS

| | | |
|---|---|---|
| 2,150,456 | Perrine | Mar. 14, 1939 |
| 2,260,798 | Burns | Oct. 28, 1941 |
| 2,556,512 | Ammon | June 12, 1951 |
| 2,852,950 | Uher | Sept. 23, 1958 |